US005773173A

United States Patent [19]
Nakano et al.

[11] Patent Number: 5,773,173
[45] Date of Patent: Jun. 30, 1998

[54] FILM THICKNESS INSPECTION METHOD AND APPARATUS

[75] Inventors: Hiroki Nakano, Otsu; Takeshi Fujiwara, Shiga-ken, both of Japan

[73] Assignee: International Business Machines Corporation, Armonk, N.Y.

[21] Appl. No.: 664,904

[22] Filed: Jun. 17, 1996

[30] Foreign Application Priority Data

Jun. 16, 1995 [JP] Japan ...................................... 7-150214

[51] Int. Cl.$^6$ .................................................. G01B 11/30
[52] U.S. Cl. ........................... 430/30; 430/7; 250/559.28; 356/239; 356/371
[58] Field of Search .................... 430/30, 7; 250/559.28; 356/239, 371

[56] References Cited

U.S. PATENT DOCUMENTS 5,619,330   4/1997   Ehemann et al. ................... 250/559.28

FOREIGN PATENT DOCUMENTS

| 56-129844 | 10/1981 | Japan . |
| 56-129845 | 10/1981 | Japan . |
| 1-313745  | 12/1989 | Japan . |
| 7-280520  | 10/1995 | Japan . |

*Primary Examiner*—John A. McPherson
*Attorney, Agent, or Firm*—Ronald L. Drumheller

[57] ABSTRACT

A color filter thickness uniformity is evaluated quantitatively and accurately at high sensitivity by using a wavelength deviating by a predetermined wavelength from a central wavelength. The whole output of a screen is unified into one color tone by a monochromatic mask set between a white light source and a color filter to mask picture elements other than those with a specific color tone. The light emitted from the screen is filtered by a filter having a wavelength $\lambda_1$ deviating by a predetermined wavelength $\Delta\lambda$ from the central wavelength $\lambda_0$ of the one color tone as the central wavelength, and the intensity of the filtered light is detected for each position on the screen to evaluate the intensity of the light detected for each position on the screen by a method such as image processing.

10 Claims, 3 Drawing Sheets

FILM THICKNESS INSPECTION METHOD AND APPARATUS

BACKGROUND OF THE INVENTION

1. Field of the Invention

The present invention relates to a method for detecting and evaluating the nonuniformity of a color tone of a two-dimensional screen.

2. Related Art

The two-dimensional screen includes a liquid-crystal panel and a television screen. Particularly, in the case of a two-dimensional screen such as a color liquid-crystal panel for obtaining various color tones by combining three colors of red (R), green (G), and blue (B), the nonuniformity of color tones on the screen has visually been detected and evaluated so far. FIG. 1 shows how to give a color tone to a liquid-crystal screen. The light source of the liquid-crystal screen uses a backlight 1 using white light. The white light is converted into light having a color tone of R, G, or B for each picture element by setting a color filter 2 having a fine structure and on which picture elements of R, G, and B are alternately arranged to the light through a liquid-crystal injecting portion 3 as shown in FIG. 1. Checking about which picture element the light reaches the color filter 2 from the backlight 1 can be performed for each picture element by applying an electric potential to liquid crystal grains injected into the liquid-crystal injecting portion 3 and by controlling the transmission and cutoff of the light in accordance with a change of the tilt angle. That is, the liquid crystal injected into the liquid-crystal injecting portion 3 is applied with a voltage by a transistor electrode 30 formed on a glass substrate 36 and receives the fluctuation of the tilt angle. The transistor electrode 30 receives power from a power supply line 32.

A color filter is applied onto a glass plate 34 by a method such as dipping, electrocoating, or printing. For example, the dipping method is an art for forming a color filter by temporarily dipping the glass plate 34 in a pigment for forming the color filter and then drying the plate 34. In the case of this method, however, nonuniformity of thickness may occur on the margin of the glass plate. Also in the case of the electrocoating and printing methods, nonuniformity of thickness cannot be avoided though the nonuniformity is not so remarkable as the case of the dipping method.

A color liquid-crystal screen has the problem that a uniform lightness cannot be obtained about the color tone of the whole screen unless the thickness of the color filter for producing a color tone is uniform over the whole screen. For example, because a portion of a color filter with a thickness larger than the standard thickness has a low light transmittance, the lightness of the portion decreases even if the portion has the same color tone of R. Moreover, the lightness change is not preferable for a person who views the screen because he recognizes the change as a lightness nonuniformity.

The nonuniform state of the lightness of a screen has visually been detected and judged so far by turning the whole screen into the color tone of only each color. In the case of the visual method, however, the criterion differs in evaluators and moreover, the criterion depends on the then physical condition of the same evaluator. Furthermore, because the criterion on what degree of nonuniformity becomes an issue is not objective, it is difficult to standardize products. Furthermore, the case may occur in which a nonuniform state of lightness cannot visually be detected though the nonuniform state actually occurs. Therefore, it is necessary to detect the nonuniformity by a more-objective method such as image processing.

As this type of conventional image inspection apparatus and method, the official gazette of Japanese Patent Laid-Open No. 181125/1993 discloses the apparatus and method using an optical low-pass filter set between an inspection object and an image processor for evaluation. The point of using a pass filter is the same as the present invention as described later. However, the prior embodiment uses the pass filter in order to prevent moire beat. Therefore, the prior embodiment is different from the present invention in its purpose because the present invention uses the pass filter in order to select a wavelength area with a high sensitivity.

SUMMARY OF THE INVENTION

It is an object of the present invention to provide a method for detecting a thickness nonuniformity of a color filter by an image processing method. It is another object of the present invention to provide an apparatus structure for realizing the method.

The above objects of the present invention can be achieved by using a screen provided with a white light source and a color filter with a plurality of picture elements arranged on it, thereby unifying all outputs of the screen into one color tone by a monochromatic mask set between the white light source and the color filter to mask picture elements other than those with a specific color tone, filtering the light emitted from the screen by a filter having a wavelength (first wavelength) deviated by a predetermined wavelength from the central wavelength of the one color tone as the central wavelength, and detecting the intensity of the filtered light or a parameter correlating with the light intensity. Moreover, the objects of the present invention can be achieved by evaluating the intensity of light detected for each position of the screen by a method such as image processing and thereby evaluating the thickness uniformity of a color filter. The light to be evaluated uses the light passing through a filter having a wavelength deviated by a predetermined wavelength from the central wavelength as the central wavelength because the dependency of a parameter such as the light intensity on a film thickness increases and improvement of the detection sensitivity can be expected.

BRIEF DESCRIPTION OF THE DRAWINGS

FIG. I illustrates the positional relation between a white light source and a color filter according to the prior art.

DESCRIPTION OF THE PREFERRED EMBODIMENTS

Figure 1:
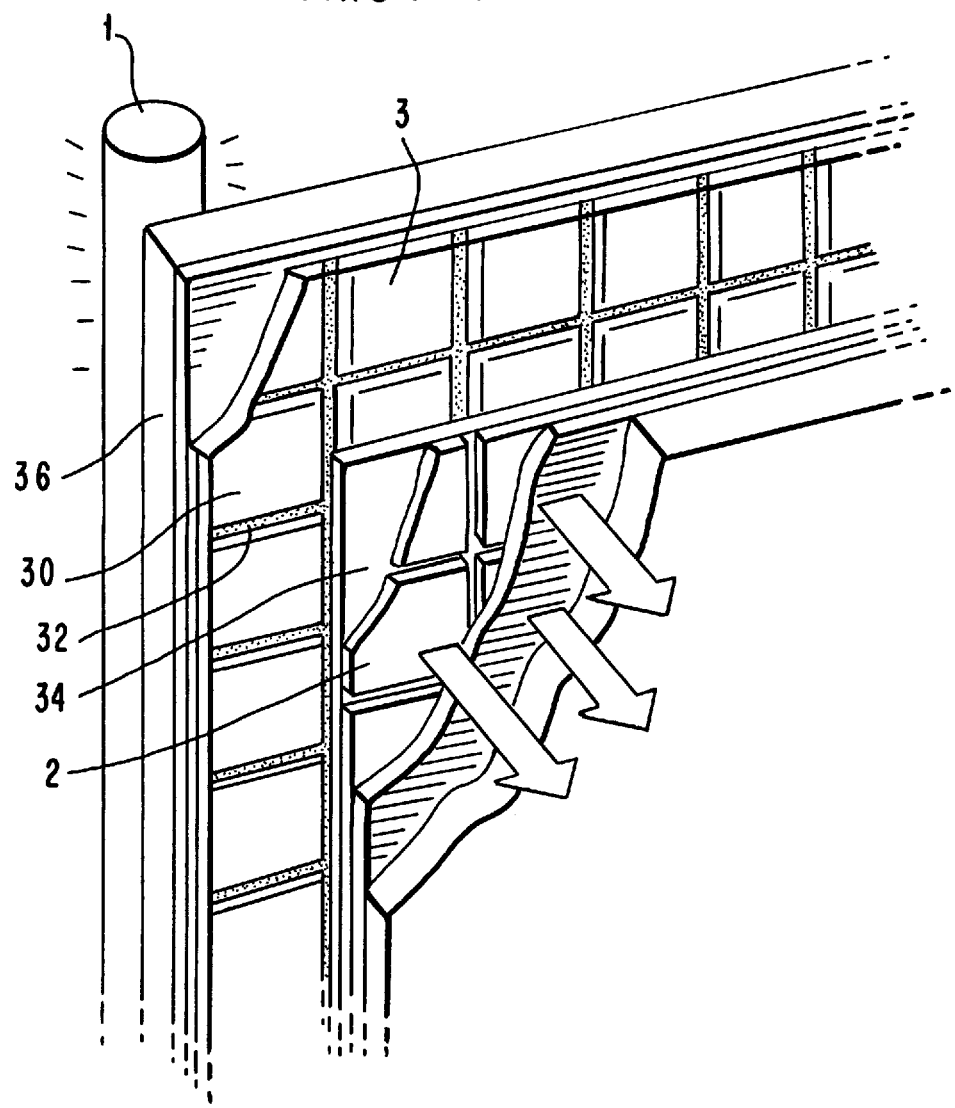
Figure 2:
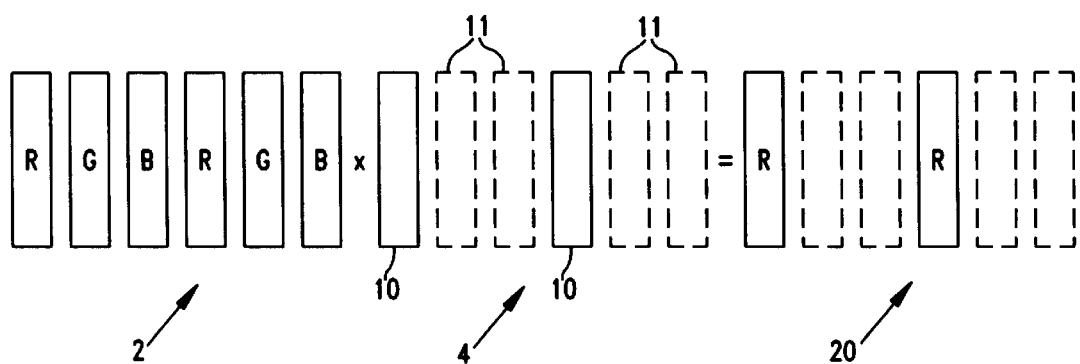
FIG. 2 illustrates top views of a color filter and a mask for transmitting only the light with a specific color tone.
Figure 3:
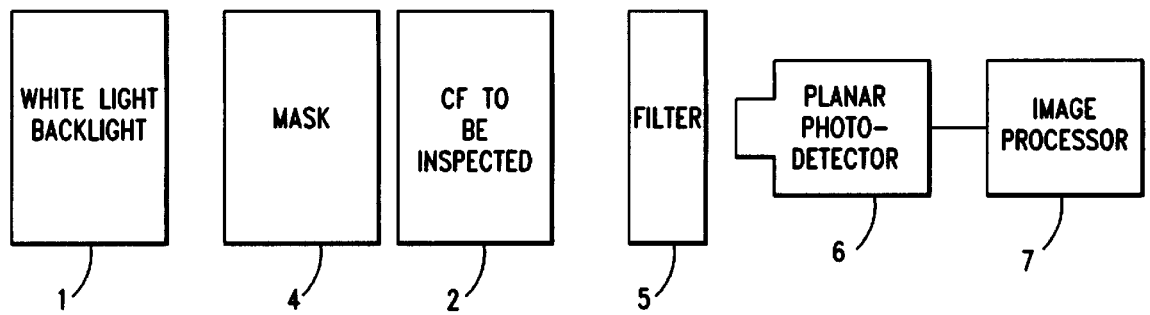
FIG. 3 illustrates a typical view of the color filter thickness evaluation apparatus of the present invention.

FIG. 3 shows a structure of the image processing method of the present invention. In this case, a backlight 1 and a color filter 2 for giving a color tone are used similarly to the case of FIG. 1. The color filter 2 is an object to be inspected. A mask 4 is set between the backlight 1 and the color filter 2. The mask 4 is set so as to mask picture elements other than the picture element with a specific color tone as shown in FIG. 2. That is, the mask 4 in FIG. 2 masks the picture elements 11 shown by a dotted line of the color filter 5. Therefore, as a result, the light passes only through a picture element 10 shown by a continuous line as shown by a screen 20. For example, because the picture element shown by the continuous line corresponds to the position of R of the color filter 2 in FIG. 2, the whole screen has a color tone of red in this case. Therefore, it is possible to evaluate the thickness uniformity of a color filter with the same color tone by unifying the whole screen into one color tone for inspection. Moreover, it is possible to know the thickness uniformity of a color filter with the same color tone by using the fact that the intensity of the wavelength of the light passing through the color filter correlates to the thickness of the color filter.

The present invention uses the intensity of a wavelength deviated from the central wavelength of light with the same color tone to obtain the correlation between light intensity and color filter thickness. Originally, even the light with the same color tone (e.g. R) comprises not a single wavelength but a wavelength having a certain distribution. For example, in the case of the correlation between wavelength and light intensity of the light passing through a filter of R as shown by a continuous line in FIG. 4, the central wavelength is 645 nm and a distribution of approx. 150 to 200 nm is present at the both sides of the central wavelength. The present invention is characterized by using the light passing through a color filter having a peripheral wavelength $\lambda_1$ deviated by $\Delta\lambda$ from the central wavelength $\lambda_1$ as the central wavelength to detect a positional distribution of light intensity on a screen and evaluating the thickness uniformity of the filter.

Figure 4:
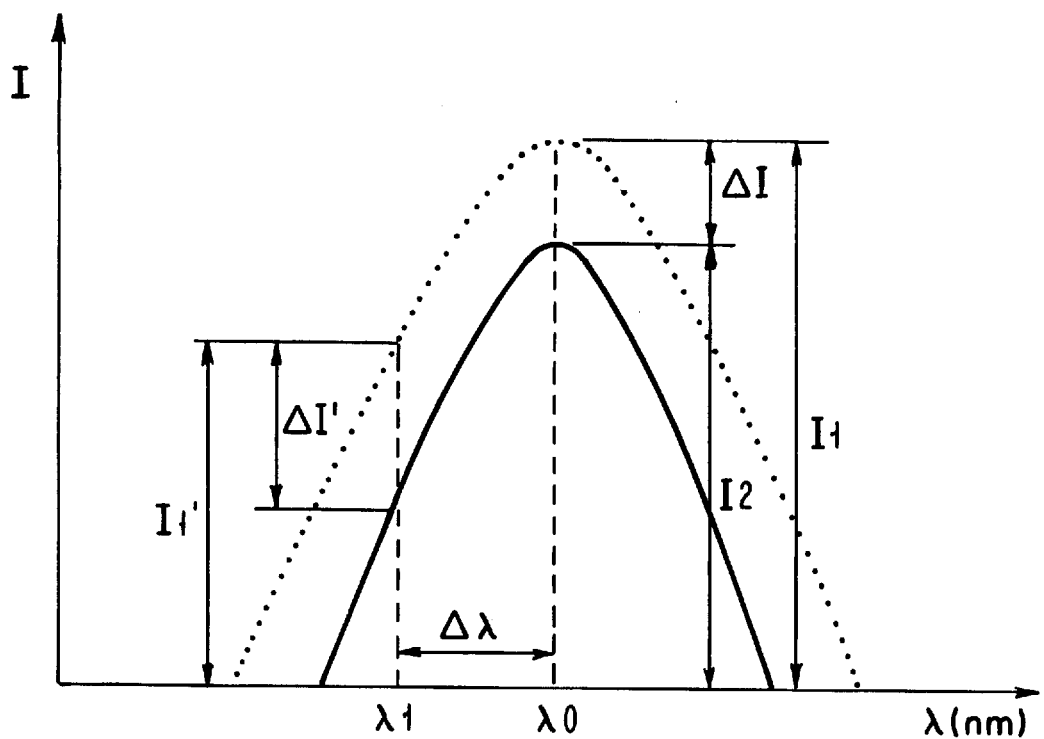
FIG. 4 illustrates the dependency between filter thickness change and wavelength intensity change.
Figure 5:
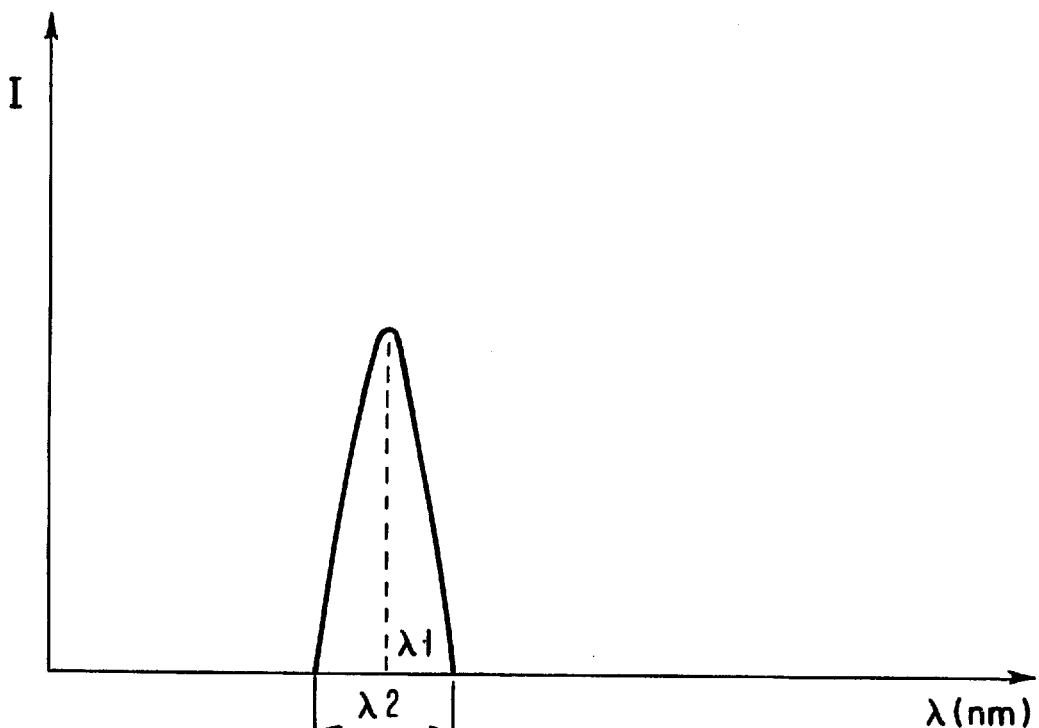
FIG. 5 illustrates the transmission characteristic of the filter of the present invention for transmitting only a wavelength to be evaluated.

As described above, because the positional distribution of light intensity on the screen is detected by using the transmitted light mainly comprising the peripheral wavelength $\lambda_1$, deviated from the central wavelength $\lambda_0$, another filter 5 is set ahead of the color filter 2. The filter 5 transmits only a wavelength in a certain range mainly comprising the wavelength $\lambda_1$ (referred to as a peripheral wavelength) deviated by a predetermined wavelength $\Delta\lambda$ from the central wavelength $\lambda_0$ of the color tone (R for this example) of a picture element to be inspected. FIG. 5 shows a distribution of wavelengths passing through a filter having the peripheral wavelength $\lambda_1$ as the central wavelength $\lambda_0$ and transmitting the light of the central wavelength $\lambda_0$. Though it is preferable to set the width $\lambda_2$ of the wavelength of the transmission characteristic of the filter shown in FIG. 5 to approx. 100 nm, the width $\lambda_2$ is not very strictly limited. A width range of 20 to 200 nm is enough to achieve the objects of the present invention. The light with the color tone of R having the distribution shown in FIG. 4 and filtered by the filter 5 having the above transmission characteristic is used to evaluate a color filter thickness. In the case of an embodiment preferable to perform the evaluation, a planar photo-detector 6 detects light correspondingly to a position on a screen and an image processor 7 evaluates the distribution of the light intensities.

The theory of image processing is described below by referring to FIG. 4. This theory uses the fact that the dependency of a relative value of a light intensity change increases depending on the thickness of a color filter for the peripheral wavelength $\lambda_1$ deviated from the central wavelength In FIG. 4, the broken line shows the dependency between wavelength and light intensity for a color filter thickness of 1 μm and the continuous line shows the dependency between wavelength and light intensity for a color filter thickness of 2 μm. When the filter thickness increases from 1 to 2 μm, the intensity I1 of light at the central wavelength $\lambda_0$ decreases by $\Delta I$ and results in I2. However, the change rate of the light intensity (dependency between filter thickness and light intensity) $\Delta I/I1$ is not very large because I1 is large. That is, the dependency between filter thickness and light intensity is relatively small for the central wavelength $\lambda_0$. However, when the filter thickness similarly changes from 1 to 2 μm for the peripheral wavelength $\lambda_1$ separate by $\Delta\lambda$ from the central wavelength $\lambda_0$, the change rate $\Delta I'/I1'$ of intensity becomes relatively large because I1' is small. Therefore, the dependency between filter thickness and light intensity is relatively large for a peripheral wavelength. Thus, by performing evaluation in a wavelength area with a relatively large dependency between filter thickness and light intensity, the evaluation sensitivity can be improved. Specifically, a change rate is measured by using a filter having the above wavelength area as the central wavelength.

Table 1 shows the correlation between specific wavelength and transmittance ($\tau$) for each filter thickness. In this case, the transmittance ($\tau$) is an index corresponding to light intensity, which is defined by the following expression:

$$\tau = I/I0 = \exp(-\mu d)$$

where,

I=Light intensity filtered

I0=Light intensity not filtered $\mu$=Absorption coefficient d=Filter thickness.

Because the absorption coefficient $\mu$ depends on the material of a color filter, it is constant for color filters distributed on one plane. Therefore, because the transmittance $\tau$ correlates to the filter thickness d, it is possible to evaluate the fluctuation of filter thickness by evaluating the transmittance $\tau$. This embodiment defines and uses transmittance as a parameter depending on a filter thickness. However, any other parameter such as light intensity or the like can be used as long as it depends on a filter thickness.

TABLE 1

| | Transmittance (%) | | |
|---|---|---|---|
| Wavelength (nm) | Filter thickness of 1 μm (I1) | Filter thickness of 2 μm (I2) | Change rate ($\Delta I/I1$) |
| Center 640 | 87.5 | 76.6 | 0.05 |
| Margin 600 | 40.7 | 35.7 | 0.12 |
| Margin 580 | 20.7 | 13.5 | 0.35* |
| Margin 560 | 15.5 | 8.6 | 0.45* |
| Margin 540 | 14.9 | 5.7 | 0.62* |
| Margin 470 | 8.1 | Difficult to detect | — |

Symbol "*" represents the central wavelength of the filter 5 usable as a preferred embodiment of the present invention. As shown in Table 1, the transmittance (having the correlation with light intensity) of light when the filter thickness changes from 1 to 2 μm changes by only 5% for the central wavelength of 640 nm of R. Therefore, the central wavelength $\lambda_0$ cannot practically be used as a wavelength for detecting the correlation between light intensity and filter thickness because its detection sensitivity is too low. This is also applied to $\lambda_0$ =600 nm in the case of $\Delta\lambda$=40 nm. When the filter thickness changes from 1 to 2 μm, the change of the light transmittance changes only by 12% and the dependency between the filter thickness and the light transmittance is not remarkable.

However, in the case of 430 nm for $\Delta\lambda=100$ nm, the change of the light transmittance reaches approx. 60% as the filter thickness increases from 1 to 2 μm and thereby, it is found that the light transmittance (or light intensity) adequately changes in this wavelength area as the filter thickness changes. Therefore, by using a wavelength deviated by a certain wavelength from the central wavelength as the wavelength to be evaluated, it is possible to perform evaluation at a high sensitivity. When using a filter having a wavelength of $\Delta\lambda=60$ nm or $\lambda_1=580$ nm as the central wavelength, the change rate comes to approx. 35%, that is, the change rate comes to 45% in the case of $\Delta\lambda=80$ nm or $\lambda_1=560$ nm. In the case of this example, by controlling a computing system, adequate improvement of the sensitivity can be expected even for $\Delta\lambda=60$ nm.

However, if the difference $\Delta\lambda$ between a central wavelength and a peripheral wavelength is too large, the absolute intensity of light decreases and detection and evaluation by the photodetector 6 and image processor 7 becomes rather difficult due to noises. Therefore, it is difficult to detect the data for the filter thickness of 2 μm when $\Delta\lambda$ equals 150 nm or $\lambda_1$ equals 470 nm because of the above reason as shown in Table 1. Thus, it is necessary to determine a peripheral wavelength used for detection and evaluation by considering two requests of the dependency between filter thickness and light intensity and the absolute intensity of detected light which are contrary to each other. It is preferable to use a peripheral wavelength of $\Delta\lambda=\pm60$ to $\pm140$ nm.

Table 2 shows the dependency of change rate of transmittance when changing wavelengths and filter thicknesses for a central wavelength of $\lambda_0=540$ nm (G). In Table 2, symbol "*" represents the data for the embodiment.

TABLE 2

| | Transmittance (%) | | |
|---|---|---|---|
| Wavelength (nm) | Filter thickness of 1 μm (I1) | Filter thickness of 2 μm (I2) | Change rate (ΔI/I1) |
| Center | 540 | 79.2 | 75.0 | 0.05 |
| Margin | 490 | 33.3 | 25.2 | 0.24 |
| Margin | 460 | 17.5 | 10.5 | 0.40* |
| Margin | 440 | 10.2 | 4.1 | 0.60* |
| Margin | 590 | 38.4 | 28.8 | 0.25 |
| Margin | 620 | 10.3 | 5.0 | 0.51* |

Similarly to the case of R, the sensitivity is improved for $\Delta\lambda=100$ nm. In the case of this example, however, even a deviation of $\Delta\lambda=$approx. 80 nm is enough as the detection sensitivity.

In the case of G, the same improvement of the sensitivity can be expected even if a deviation from the central wavelength occurs at the small wavelength side or large wavelength side as shown in Table 2.

Table 3 shows the result of performing the same measurement for B with the central wavelength of $\lambda_0=430$ nm. In Table 3, symbol "*" represents the data for the embodiment.

TABLE 3

| | Transmittance (%) | | |
|---|---|---|---|
| Wavelength (nm) | Filter thickness of 1 μm (I1) | Filter thickness of 2 μm (I2) | Change rate (ΔI/I1) |
| Center | 430 | 86.8 | 72.9 | 0.16 |
| Margin | 490 | 65.0 | 50.7 | 0.22 |
| Margin | 510 | 42.0 | 27.3 | 0.35* |
| Margin | 530 | 27.6 | 8.6 | 0.69* |

In this case, the detection sensitivity at the position of $\Delta\lambda=100$ nm is very preferable. Moreover, considerable improvement of the sensitivity can be expected even for 80 nm.

The present invention realizes a high-sensitivity measurement by using the filter 5 having the central wavelength shown in Tables 1 to 3 for R, G, and B respectively and thereby filtering the light emitted from a monochromatic screen. Moreover, it is enough to use a filter with a band width $\lambda_2$ of 20 to 200 nm.

This specification describes a color filter as an object whose thickness is evaluated because of evaluating a filter thickness at a high sensitivity by passing light having wavelengths distributed about a certain wavelength $\lambda_0$ through a filter having the central wavelength at the position of $\lambda_1$ deviated by $\Delta\lambda$ from the central wavelength $\lambda_0$ and using the transmitted light in order to evaluate the thickness uniformity of the filter. Therefore, it will be apparent for a person skilled in the art that the technical thought of the present invention is not restricted to this embodiment.

The present invention makes it possible to quantitatively evaluate the thickness uniformity of a color filter by an objective method such as image processing though the thickness uniformity has visually been evaluated so far. Moreover, because a wavelength deviated by a certain wavelength from the central wavelength of the color tone of the color filter for evaluation is used as the wavelength to be evaluated, a filter thickness change is detected at a high sensitivity and accurate evaluation is realized.

We claim:

1. A color filter thickness inspection method for inspecting the thickness of a color filter with a plurality of picture elements arranged on it on a screen provided with a white light source and said color filter, comprising the steps of:
   unifying all outputs of said screen into one color tone;
   filtering the light emitted from said screen by a filter having a first wavelength deviated by a predetermined wavelength $\Delta\lambda$ from the central wavelength of said one color tone as the central wavelength;
   detecting said filtered light; and
   evaluating said detected light to evaluate film-thickness uniformity.

2. The color filter thickness inspection method according to claim 1, wherein the step of detecting said filtered light is executed for each position on said screen.

3. The color filter thickness inspection method according to claim 2, wherein the thickness uniformity of said color filter is evaluated by evaluating said light detected for each position on said screen.

4. The color filter thickness inspection method according to claim 1, wherein the step of evaluating the uniformity of said thickness uses the intensity of said detected light as a parameter.

5. The color filter thickness inspection method according to claim 1, wherein the step of evaluating the uniformity of said thickness uses a parameter having a correlation with the intensity of said detected light.

6. The color filter thickness inspection method according to claim 1, wherein the step of unifying all outputs of said screen into one color tone is executed by masking picture elements other than those with a specific color tone between said white light source and color filter.

7. The color filter thickness inspection method according to claim 1, wherein said Δλ ranges between ±60 and ±140 nm to said central wavelength.

8. A color filter thickness evaluation apparatus for evaluating the thickness of a color filter which transmits a wavelength distribution having a specific distribution out of the light emitted from a white light, comprising:

a white light source;

means for setting said color filter toward said white light source;

masking means set between said setting means and said white light source to transmit only the light reaching a portion of said color filter having a specific color tone;

filtering means for transmitting only the light including a wavelength group having a wavelength deviated by a specific wavelength Δλ from the central wavelength of said specific color tone as the central wavelength; and means for evaluating the light of said wavelength group.

9. The color filter thickness evaluation apparatus according to claim 8, wherein said Δλ ranges between ±60 and ±140 nm to said central wavelength.

10. A filter thickness inspection method for inspecting the thickness of a color filter having picture elements of a first color tone and picture elements of at least one other color tone, the picture elements of the first color tone passing light within a first frequency band centered at a first light frequency, comprising the steps of:

positioning a white light source on one side of the color filter;

selectively enabling light from the white light source to pass through at least some of the picture elements of the first color tone and not to pass through any of the picture elements of the at least one other color tone;

filtering the light that has passed through the color filter with a light filter that passes light within a second frequency band different from but overlapping the first frequency band, the second frequency band being centered at a second light frequency different from the first light frequency;

detecting the filtered light; and evaluating the detected light to evaluate film thickness uniformity.

* * * * *